United States Patent [19]

Knapp et al.

[11] 4,416,241

[45] Nov. 22, 1983

[54] MIXTURE FORMATION SYSTEM FOR MIXTURE-COMPRESSING INTERNAL COMBUSTION ENGINES WITH EXTERNALLY SUPPLIED IGNITION

[75] Inventors: Heinrich Knapp, Leonberg; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 287,002

[22] Filed: Jul. 27, 1981

[30] Foreign Application Priority Data

Aug. 26, 1980 [DE] Fed. Rep. of Germany ....... 3032066

[51] Int. Cl.³ .............................................. F02M 51/00
[52] U.S. Cl. ................................... 123/494; 123/470; 123/585; 73/118
[58] Field of Search ............... 123/494, 472, 470, 445, 123/585, 478; 73/116, 118

[56] References Cited

U.S. PATENT DOCUMENTS

| | | | |
|---|---|---|---|
| 3,785,354 | 1/1974 | Moulds | 123/478 |
| 3,824,966 | 7/1974 | Schneider et al. | 123/494 |
| 3,868,936 | 3/1975 | Rivere | 123/445 |
| 3,975,951 | 8/1976 | Kohama et al. | 123/494 |
| 4,321,900 | 3/1982 | Takeda | 123/585 |
| 4,341,193 | 7/1982 | Bowler | 123/472 |

Primary Examiner—William A. Cuchlinski, Jr.
Assistant Examiner—Andrew M. Dolinar
Attorney, Agent, or Firm—Edwin E. Greigg

[57] ABSTRACT

A mixture formation system is proposed for mixture-compressing internal combustion engines with externally supplied ignition. The mixture formation system includes an air intake fitting in which an electromagnetically actuatable injection valve is held concentrically, upstream of a throttle valve. Disposed upstream of the injection valve is an air flow rate meter provided with a temperature-dependent resistor. The electronic regulating device of the air flow rate meter and a pressure regulator for regulating the fuel pressure at the injection valve as well as a supplementary air valve for controlling an air bypass bypassing the throttle valve during the warm-up phase of the engine may be provided on the air intake fitting. As a result, a mixture formation system is attained which is simply constructed and functions reliably, and which because of its compact structure can be accommodated in the engine compartment of an internal combustion engine even where space is extremely limited.

14 Claims, 6 Drawing Figures

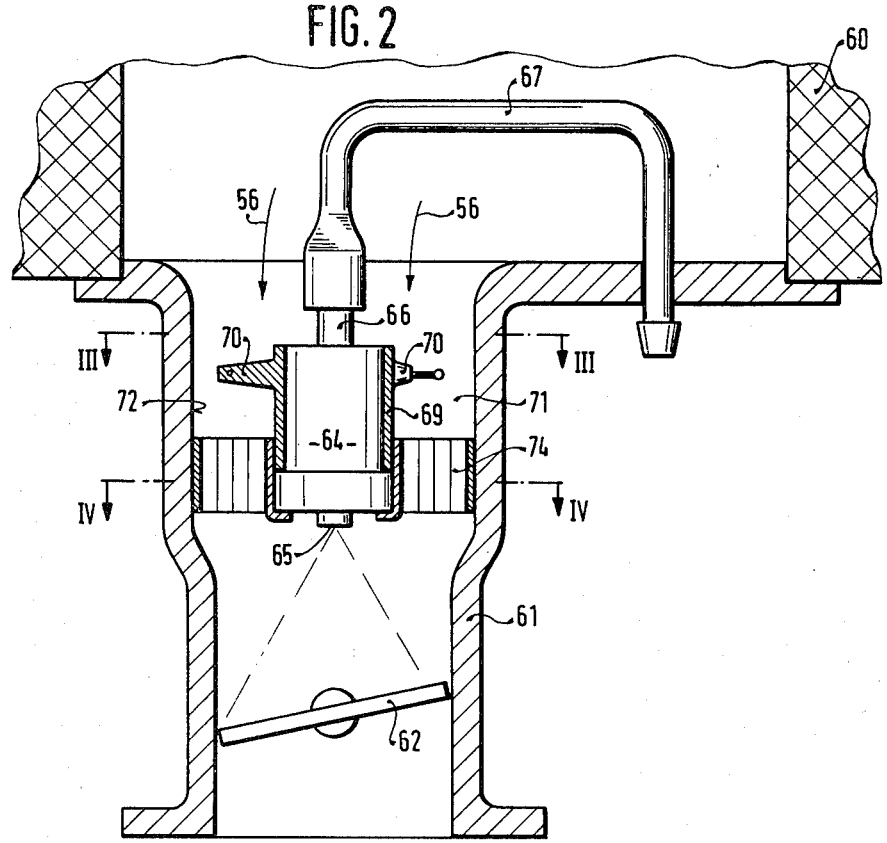
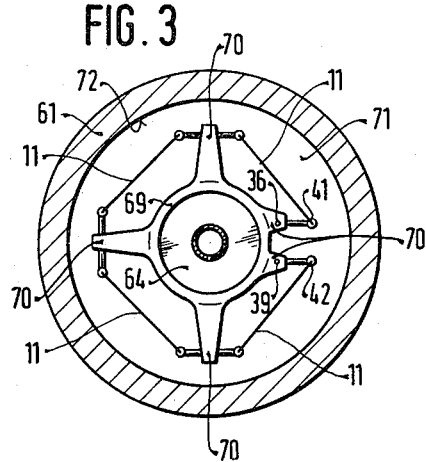
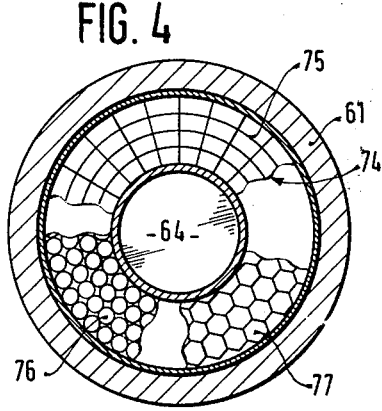

MIXTURE FORMATION SYSTEM FOR MIXTURE-COMPRESSING INTERNAL COMBUSTION ENGINES WITH EXTERNALLY SUPPLIED IGNITION

CROSS-REFERENCE TO RELATED COPENDING APPLICATIONS

There are no patents or printed publications having a bearing on the patentability of the present invention, but of interest are the following:

Knapp, Heinrich et al—Ser. No. 285,893, Filed July 23, 1981

Knapp, Heinrich et al—Ser. No. 064,265, Filed Aug. 6, 1979

Peter, Cornelius—U.S. Pat. No. 4,196,622

BRIEF DESCRIPTION OF THE INVENTION

The invention is based upon and relates to a mixture formation system for mixture-compressing apparatus for internal combustion engines with externally supplied ignition.

BACKGROUND OF THE INVENTION

A mixture formation system is already known in which an air flow rate meter, embodied as a baffle plate, is disposed upstream of a fuel emission element in the air intake fitting. The air flow rate meter influences the fuel output quantity and makes the system undesirably long structurally. This causes difficulties in accommodating the system in the engine compartment of a motor vehicle.

OBJECT AND SUMMARY OF THE INVENTION

The mixture formation system according to the invention has the advantage over the prior art of providing a very compact, small-structured system which functions reliably and can be realized in a simple manner; this permits installation in the engine compartment of motor vehicle internal combustion engines, even where space is extremely limited.

As a result of the characteristics disclosed in modifications and species of embodiments of the invention, advantageous modifications of and improvements in the mixture formation system can be attained. It is particularly advantageous to use an electromagnetic injection valve as the fuel output element, which is concentrically disposed in the air intake fitting and about which the air flow rate meter is guided, as close as possible to the injection location. The air flow rate meter is embodied as a temperature-dependent resistor. The guidance of the temperature-dependent resistor may be accomplished in an advantageous manner by means of an annular body which forms one section of the air intake fitting.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2 shows a partial and cross-sectional view of a first exemplary embodiment of a mixture formation system;

FIG. 3 is a section taken along the line III—III in FIG. 2;

FIG. 4 is a section taken along the line IV—IV of FIG. 2;

DESCRIPTION OF THE PREFERRED EMBODIMENTS

Figure 1:
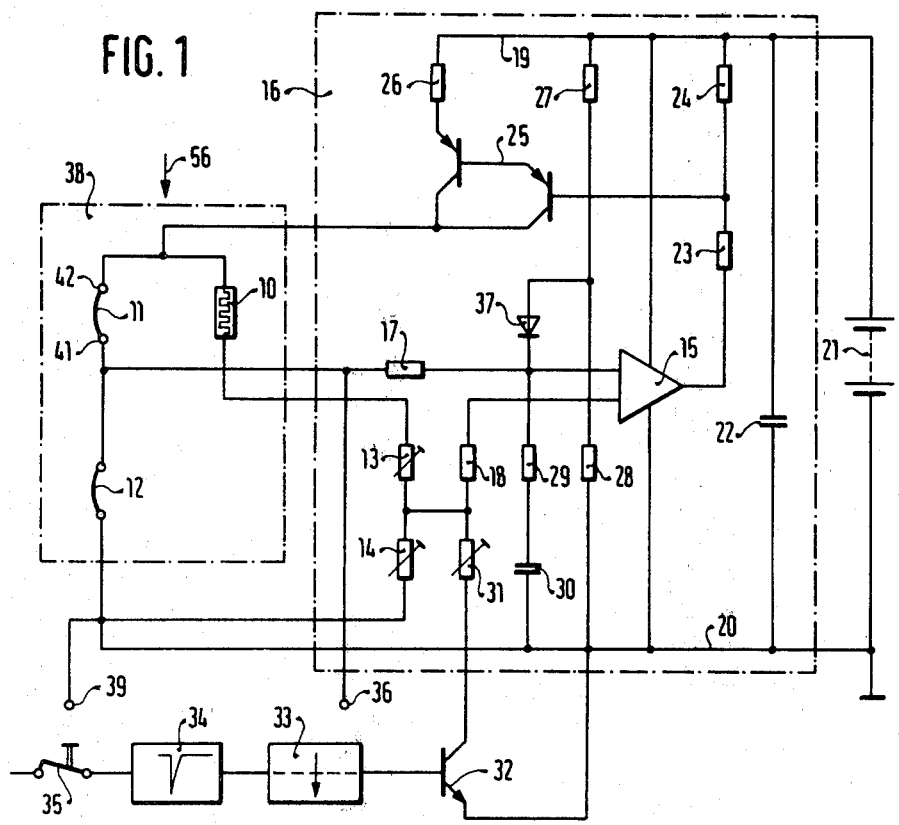
FIG. 1 is a circuit diagram of an apparatus for measuring the mass of a flowing medium, and in particular for measuring the flow rate of air aspirated by internal combustion engines.

In the apparatus illustrated in FIG. 1 for measuring the mass of a flowing medium, and in particular for measuring the flow rate of air aspirated by internal combustion engines, a bridge circuit is provided which comprises a temperature-dependent resistor 10, a temperature-dependent resistor 11, a resistor 12, and resistors 13 and 14. A regulating amplifier 15 of a regulating device 16 is connected to the diagonal of the bridge. The inverting input of the regulating amplifier 15 is connected via an input resistor 17 to the coupling point of the resistors 11 and 12, while the non-inverting input of the regulating amplifier 15 is connected via an input resistor 18 to the coupling point of the resistors 13 and 14. The regulating amplifier 15 is connected via two supply lines 19 and 20 with a direct-voltage source 21. A smoothing capacitor 22 is switched parallel to this direct-voltage source 21. The output of the regulating amplifier 15 is connected with the series circuit of two resistors 23 and 24, the resistor 24 being connected to the common supply line 19. These two resistors 23 and 24 represent a voltage divider for a Darlington circuit 25, which together with a resistor 26 represents a voltage-controlled current source for supplying the bridge circuit made up of the resistors 10, 11, 12, 13 and 14 with electric current. A voltage divider comprising resistors 27 and 28 is located between the common supply lines 19 and 20. The anode of a diode 37 is connected to the coupling point of the resistors 27 and 28, and its cathode is connected with the inverting input of the regulating amplifier 15. Between the inverting input of the regulating amplifier 15 and the common supply line 20, there is a series circuit comprising a resistor 29 and a capacitor 30; this resistor-capacitor combination serves to adapt the frequency of the regulating circuit to the behavior over time of the temperature-dependent resistors.

A resistor 31 is connected to the coupling point of the resistors 13 and 14 and is capable of being connected via the switching path of a switching transistor 32 with the common supply line 20. The base of the switching transistor 32 is connected with the output of a monostable multivibrator 33, which is triggerable via a differentiating element 34 by an ignition switch, symbolically indicated at 35, for the ignition system of the engine or by a pulse furnished by some other means.

The mode of operation of the apparatus described is as follows:

A predetermined electric current flows over the temperature-dependent resistor 11 of the bridge circuit, and this heats the resistor 11 up to its normal operating temperature. In another branch of the bridge circuit, the temperature-dependent resistor 10 assumes a resistance value which characterizes the temperature of the flowing medium, for instance that of the air aspirated by the engine. As a result, it is always the temperature of the air aspirated by the engine which is used as a reference signal for regulating the heating current of the apparatus for air flow rate measurement. In accordance with the mass of the aspirated air flowing past it, the temperature-dependent resistor 11 is cooled down to a greater or lesser extent. This causes an imbalancing of the bridge circuit. This imbalance of the bridge circuit is compensated for in that the regulating amplifier furnishes a higher supply voltage for the bridge circuit, via the voltage-controlled current source 23, 24, 25 and 26. Thus the temperature of the temperature-dependent resistor 11 and thus its resistance value is held to a value which is at least approximately constant. The current flowing through the bridge circuit is a standard for the air mass flowing past the temperature-dependent resistor 11 in the direction of the arrow 56. A corresponding electric signal may be picked up between a terminal 36 and a terminal 39.

The voltage divider 27, 28, with the diode 37, serves the purpose of making the startup of the regulating device easier. When the regulating device is switched on, a voltage of approximately 0.5 volts is forced to appear at the inverting input of the regulating amplifier 15, permitting reliable starting up of the regulating device. During normal operation, in contrast, the voltage at the inverting input of the regulating amplifier 15 is at a substantially higher level than this initial voltage, so that the diode 37 is blocked and thus no influence on the regulation procedures can be exerted by way of the voltage divider 27, 28.

As will now be described, the temperature-dependent resistor 11 is embodied as a hot wire or hot strip. In order from time to time to free it of deposits on its surface, an increased current is intended to flow over this temperature-dependent resistor 11 after a predetermined measurement cycle. A predetermined length of engine operation may be selected, by way of example, to serve as this predetermined measurement cycle. The glow-heating procedure intended for burning off deposits from the temperature-dependent resistor 11 may, alternatively, be triggered each time the ignition system of the engine is shut off. This is effected by shutting off the ignition switch 35. The corresponding signal is differentiated and it directs the monostable multivibrator 33 into its unstable switching status. During this unstable switching status of the monostable multivibrator 33, the switching transistor 32 becomes conductive and switches the resistor 31 parallel to the resistor 14 of the bridge circuit. As a result, the bridge circuit comprising the resistors 10, 11, 12, 13 and 14 becomes severely imbalanced, such that the regulating amplifier 15, in order to compensate for this imbalance, furnishes an increased current for the bridge circuit. This increased current heats the temperature-dependent resistor 11, for the duration of the unstable switching status of the monostable multivibrator, to a temperature above the normal operating temperature, so that deposits on the surface of the temperature-dependent resistor burn off.

It has proved to be particularly useful for the material comprising the temperature-dependent resistor 11 to be a structurally stabilized platinum, because this material is particularly well suited for being heated to high temperatures. This has particular importance for the burn-off procedure.

The reference resistor 12 is advantageously also housed in the flow cross section indicated by a broken line 38, for example the intake tube of the engine, because then the lost heat of the reference resistor 12 can be carried off by the air flowing in the direction of the arrow 56. The resistors 13 and 14 are efficiently embodied as adjustable resistors, so that the temperature behavior of the regulating circuit can be adjusted.

Figure 5:
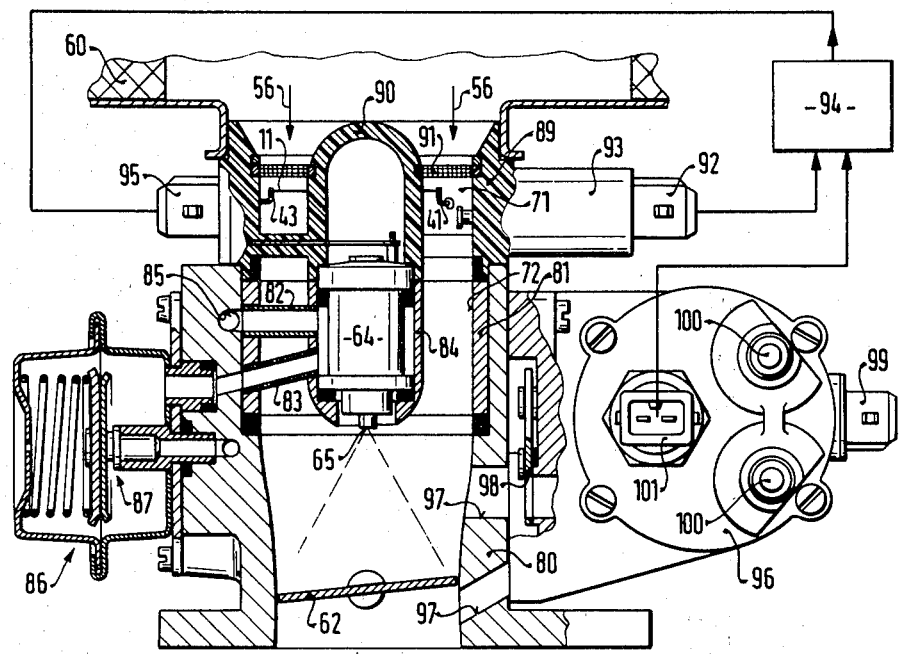
FIG. 5 shows a partial and cross-sectional view of a second exemplary embodiment of a mixture formation system in accordance with the invention.

The apparatus for measuring the mass of a flowing medium according to FIG. 1 is used in a mixture formation system, shown by way of example in FIGS. 2 and 5. In the mixture formation system shown in FIG. 2, the combustion air aspirated by the engine flows in the direction of the arrow 56 through an air filter 60, shown only in part, and into an air intake fitting 61. A throttle device embodied as a throttle valve 62 is disposed in the air intake fitting 61, by means of which the flow channel for the aspirated air, which is embodied by the air intake fitting, is opened to a greater or lesser extent. Upstream of the throttle valve 62 and concentrically with the air intake fitting 61, an electromagnetic injection valve 64 acting as a fuel emission element is disposed such that the fuel ejected via the fuel outlet location 65 has a conical formation as it reaches the opening gap formed between the throttle valve and the air intake fitting. The electromagnetic injection valve 64, as will be explained more fully in connection with FIG. 5, is provided with an electrical plug connection by way of which the triggering of the electromagnetic injection valve 64 is accomplished under the direction of an electronic control device. The supply of fuel to the injection valve 64 is effected via a fuel connection fitting 66 and, by way of example, a hose line 67. Upstream of the fuel outlet location 65, in this exemplary embodiment, a carrier body 69 is disposed on the injection valve 64 and concentrically therewith. The carrier body 69 has radially extending carrier arms 70, between which a hot wire 11 or hot strip 11 for measuring the flow rate of aspirated air is stretched in such a manner that it is insulated from the carrier body 69 (FIG. 3). As is shown in FIG. 3, the hot wire 11 or hot strip 11 comprises, by way of example, four wire segments 11 stretched in sequence between the individual carrier arms 70, 70, 70, 70 and are advantageously disposed in the flow in such a manner that a good average value is produced. The fastening of the individual hot wires 11 disposed in sequence one behind the other is effected at the carrier arms 70 by way of support points; the terminal support points of the hot wire are indicated by reference numerals 41 and 42. The terminal support points 41 and 42, in turn, are respectively connected to a terminal 36 and 39, at which the measurement signal characterizing the air mass flowing through the air intake fitting can be picked up. The carrier body 69 and the carrier arms 70 are advantageously manufactured of plastic. The suspension of the temperature-dependent resistor 11 embodied as a hot wire or hot strip is thus effected within an annular gap 71 between the carrier body 69 and the inside diameter 72 of the air intake fitting 61.

Downstream of the temperature-dependent resistor 11, a protective element 74 may be provided; it is disposed in the air intake fitting 61 transversely to the air flow direction and is embodied in in the form of a grid, in order to rectify the air flow, that is, to make the air flow uniformly in a given direction. The rectifying action of the protective element 74 is useful, because a deflection of the air flow takes place at the throttle valve 62; this could expose the individual segments of the temperature-dependent resistor 11 to different conditions, thus falsifying the measurement results. On the other hand, the protective element 74 prevents fuel droplets from reaching the temperature-dependent resistor 11 in the case of a backup flow. Beyond this, the protective element 74 may also serve the purpose of holding the injection valve 64 in place. As is shown in FIG. 4, the protective element has conduits extending parallel to the flow, which in cross section, by way of example, may be rectangular, as at 75; round, as at 76; or honeycomb-like, as at 77.

Downstream of the air intake fitting 71, the air intake tube is subdivided, leading to the individual cylinders of an internal combustion engine not shown herein.

In the second exemplary embodiment of a mixture formation system shown in FIG. 5, the reference numerals used in the previous figures are used again for elements which are identical and have identical functions. The second exemplary embodiment according to FIG. 5 has an air intake fitting 80, into which a carrier ring 81 is concentrically inserted upstream of the throttle valve 62. A fuel inflow tubule 82 and a fuel outflow tubule 83 are inserted into the carrier ring 81 in a sealing manner. The other ends of the fuel inflow tubule 82 and the fuel outflow tubule 43 are secured in a sealing manner on a holder body 84, by means of which the injection valve 64 is guided concentrically in the air intake fitting 80 upstream of the throttle valve 62. The fuel flowing in from a fuel pump (not shown) via a fuel conduit 85 in the air intake fitting 80 passes through the fuel inflow tubule 82 into the electromagnetic injection valve 64, through which a portion of the fuel is ejected. The remaining portion of the fuel passes through the fuel injection valve 64 in order to cool it and in order to carry away any vapor bubbles which may have formed; it then flows via the fuel outflow tubule 83 into a pressure regulator valve 86, embodied by way of example as a diaphragm pressure regulator, by means of which the fuel pressure at the injection valve is regulated, and by way of the opened valve seat 87 of which fuel can flow to the intake side of the fuel pump or to the fuel container. The pressure regulator valve 86 is efficiently disposed on the air intake fitting 80 in the vicinity of the injection valve 64, in order to attain the most compact possible embodiment.

An annular body 89 is mounted concentrically on the air intake fitting 80 upstream of the injection valve, and the air filter 60 adjoins it. A flow guidance body 90 is mounted on the holder body 84 of the injection valve 64, and the annular gap 71 is formed between this flow guidance body 90 and the inside diameter of the annular body 89. A temperature-dependent resistor 11, embodied either as a hot wire or as a hot strip, is stretched out in this annular gap 71, being guided by means of support points 41, 42, 43, 44. The support points 41 to 44 are efficiently hook-like in embodiment, and the hot strip or hot wire 11 is secured on these support points in a known manner. The temperature-dependent resistor 11 is guided within the annular body 89 in such a way that it extends as close as possible to the fuel outlet location 65, producing the smallest possible structural height on the part of the air intake fitting equipped with the annular body 89. Upstream of the temperature-dependent resistor 11, a protective element 91 is provided transversely to the air flow direction 56. The protective element is grid-like in embodiment, and may be embodied as a wire screen by way of example, as shown in FIG. 6.

The measurement signal for the aspirated air mass furnished by the temperature-dependent resistor 11 can be picked up at an electric plug connection 92, which is provided on a block-like section 93 of the annular plug 89 extending transversely to the air intake fitting 80. The signal can be fed to an electronic control device 94, to which other measurement values for engine operating conditions can also be fed, such as those for temperature, exhaust gas composition and the like. The injection valve 64 can be controlled by this electronic control device 94 via an electric plug connection 95, which may likewise be disposed on the annular body 89. A supplementary air valve 96 is advantageously also disposed on the air intake fitting 80 and controls an air bypass 97 bypassing the throttle valve 62 during the warm-up phase of the engine. The supplementary air valve 96 functions in a known manner, having a movable valve element 98 opening the air bypass 97 to a greater or lesser extent; in a manner not shown, the movable valve element 98 is held open by a bimetallic spring during the warm-up phase of the engine. The bimetallic spring is capable of being heated by an electric heating element via an electric plug connection 99, so that the control of the air bypass 97 during the warm-up phase of the engine is accomplished in accordance with both a time and a temperature function. The housing of the supplementary air valve 96 may be subjected to the flow through it of the coolant of the engine. This purpose is served by the connecting fittings 100 for any conventional coolant. A temperature probe may likewise protrude into the coolant line of the supplementary air valve 96, and its measurement value may be fed to the electronic control device 94 via an electric plug connection 101.

Figure 6:
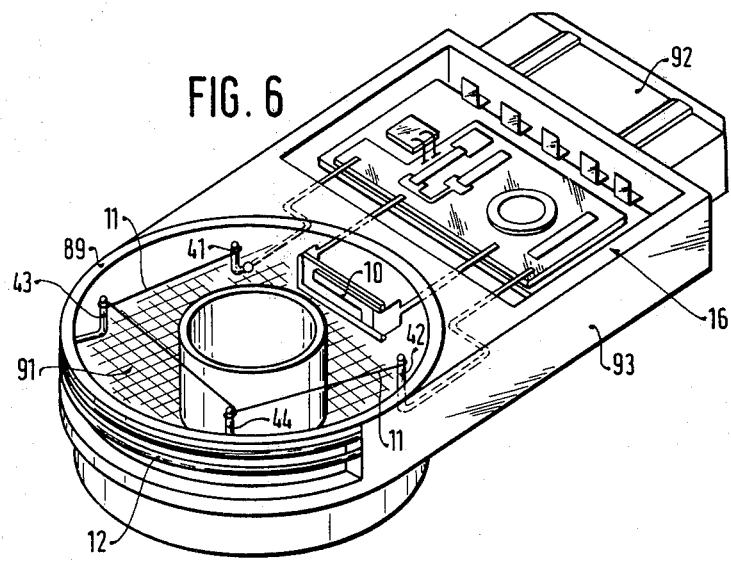
FIG. 6 shows a perspective view of an embodiment of an air flow rate meter having an annular body.

In FIG. 6, the annular body 89 is shown in a perspective view. The annular body 89 encloses not only the temperature-dependent resistor 11 but also the compensating resistor 10, as well as the reference resistor 12 which communicates at the circumference with the air flow and is manufactured of manganin wire. The electronic regulating device 16 is embodied as a hybrid switching circuit and accommodated in the block-like section 93, so that the air flow rate meter together with the regulating device is compactly housed in the annular body 89 having the block-like section 93.

The exemplary embodiments discussed herein represent reliable and simply constructed mixture formation systems, which are compact in structure because of their low structural height and can accordingly be accommodated in the engine compartment of internal combustion engines even when space is extremely limited.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A mixture formation system for mixture-compressing internal combustion engines with externally supplied ignition, comprising:
   a generally tubular air intake fitting having an electromagnetic injection valve element disposed concentrically therein and upstream of a throttle device disposed in said fitting,
   an air-flow rate meter disposed upstream of a fuel outlet location of said valve element directed coaxially relative to said air intake fitting for measuring the flow of intake air, means defining an annular gap which surrounds said injection valve element, said air-flow rate meter including at least one temperature-dependent resistor disposed in said annular gap surrounding said injection valve element upstream of said fuel outlet location, and means for regulating the temperature of said resistor in accordance with flowing air mass to a constant value, the inner diameter of said annular gap extending concentrically with the outer diameter of said injection valve element, and the outer diameter of said annular gap extending concentrically with the inner diameter of said air intake fitting.

2. A mixture formation system as defined by claim 1, characterized in that the temperature-dependent resistor is secured in an insulated manner on a carrier body disposed on the injection valve element such that it is guided within the annular gap formed between the carrier body and the air intake fitting.

3. A mixture formation system as defined by claim 1, wherein said temperature-dependent resistor comprises insulating means supporting said resistor on an annular body representing a section of said air intake fitting.

4. A mixture formation system as defined by claim 3, wherein said temperature-dependent resistor is located on said annular body in close proximity to said fuel outlet location.

5. A mixture formation system as defined by claim 4, wherein said annular body encloses elements of a bridge circuit and an electronic regulating device.

6. A mixture formation system as defined by claim 5, wherein said annular body comprises a block-like section extending transversely to and outside said air intake fitting, which encloses said electronic regulating device and an electric plug connection.

7. A mixture formation system as defined by claim 1, wherein a flow-permeable protective grid element is provided upstream of said temperature-dependent resistor and is disposed transversely to the air flow direction.

8. A mixture formation system as defined by claim 1, characterized in that at least between the temperature-dependent resistor and the fuel outlet location, a protective element is provided which is disposed transversely to the air flow direction, embodied in grid-like fashion, and rectifies the air flow.

9. A mixture formation system as defined by claim 8, characterized in that the injection valve element is held by the protective element in the air intake fitting.

10. A mixture formation system as defined by claim 1, wherein upstream of said injection valve a generally cylindrical flow guidance body is disposed concentrically with said air intake fitting adjacent said injection valve.

11. A mixture formation system as defined by claim 1, wherein an air filter is disposed directly upstream of said air intake fitting.

12. A mixture formation system as defined by claim 1, wherein a pressure regulator valve regulating the fuel pressure at said fuel outlet location is disposed on said air intake fitting in the vicinity of said injection valve element.

13. A mixture formation system as defined by claim 12, wherein a supplementary air valve controlling an air bypass bypassing said throttle device is disposed on said air intake fitting in the vicinity of said injection valve element.

14. A mixture formation system as defined by claim 1, wherein said injection valve element is held concentrically in a carrier ring via at least one fuel line, said carrier ring being capable of insertion into said air intake fitting.

* * * * *